Patented June 9, 1931

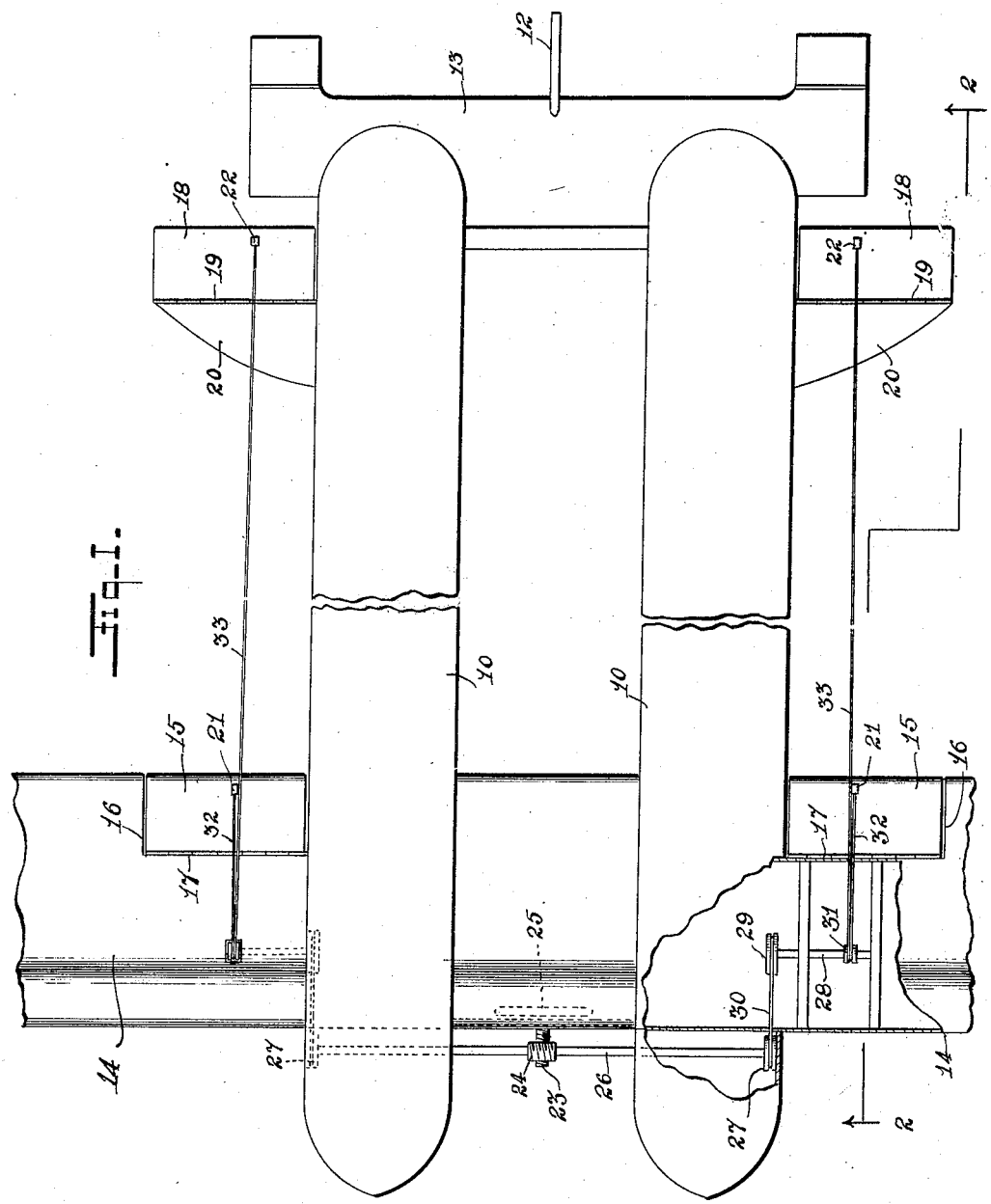

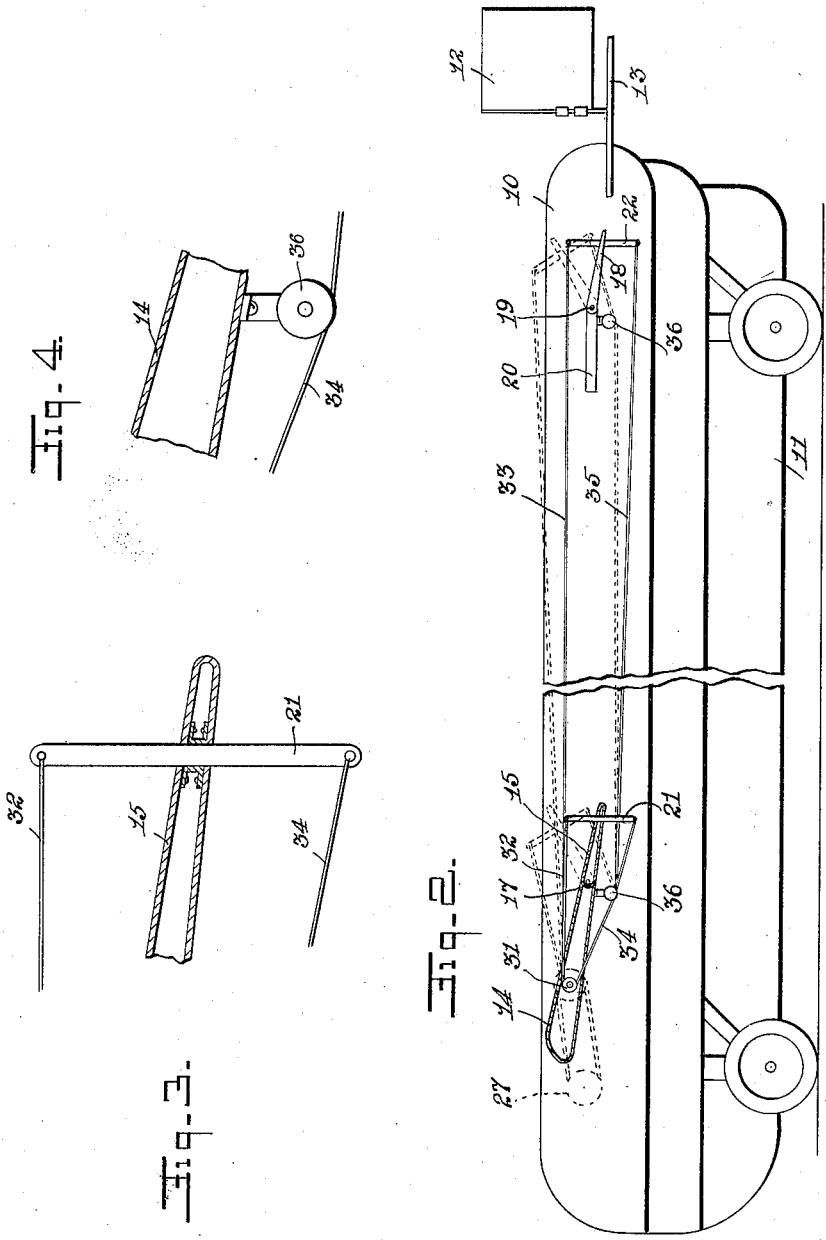

1,809,253

UNITED STATES PATENT OFFICE

MAX B. PUPP, OF SOUDERTON, PENNSYLVANIA, ASSIGNOR OF ONE-HALF TO CLAYTON K. GOTWALS, OF SOUDERTON, PENNSYLVANIA

AIRCRAFT

Application filed April 17, 1930. Serial No. 444,938.

This invention relates to aircraft and has for an object to provide improved means associated with an aircraft of the semi-buoyant type to facilitate landing in case of discontinuance of power or the like.

A further object of the invention is to provide an aircraft of the semi-buoyant type with improved elevators under the control of the pilot for directing the altitude of a semi-buoyant aircraft when the propulsion is discontinued.

A further object of the invention is to provide means for co-action with a semi-buoyant aircraft having provision for varying the ballast load in accordance with my co-pending application, Serial Number 444,937, filed coincidentally for ballast for aircraft, whereby the ballast overweight load beyond the buoyancy being discharged or retained as occasion may require will be assisted in landing by the provision of the facilities herein disclosed.

With these and other objects in view, the invention comprises the provision of elevators which will be referred to as bow and stern, it being understood that the terms are only relative to each other and to the general arrangement upon the craft without indication that either of said elevators are at the exact bow or exact stern, which said elevators may be tilted under the control of the pilot for the purpose of controlling the descent of the craft when propulsion is discontinued.

My invention is directed to other objects and possesses other features of novelty and advantage, some of which, together with the foregoing, will be hereinafter set forth.

In the drawings:—

Figure 1 is a top plan view of a type of aircraft embodying the present invention, Figure 2 is a view partly in side elevation and partly in section as indicated by line 2—2 of Figure 1, Figure 3 is an enlarged detail view of a section of one of the elevators, and Figure 4 is an enlarged detail view of one of the idlers over which the cable operates.

Like characters of reference indicate corresponding parts throughout the several views.

The present invention is directed to structure to accompany a semi-buoyant air-craft of any type and is herein merely illustrated by the buoyant chambers 10, it being understood that the showing of these buoyant chambers as two in number and the arrangement, shape, sizes, proportions, connections or other features relative thereto form no part of the present invention and is no limitation thereon.

Whatever the form of the buoyant chambers, there is carried thereby a car 11. This also is merely illustrative and any type of car, singular or plural attached in any way and in any position is within the scope of the invention and the specific positioning, shape and arrangement as shown in the drawings is no limitation.

At the stern, the usual controlling means 12 and 13 are provided, being herein merely conventionally shown and also merely illustrative.

The wings 14 likewise may be of any usual type whereby the craft is a monoplane, biplane or multi-plane, and it is to be understood that there is no limitation to arise from showing the present craft in the drawings as a monoplane.

One of the wings upon each side of the craft is provided with a section 15 preferably accommodated in a cut-out part 16 in the wing and hinged thereto at the forward edge of the section 15, such hinging being indicated at 17. The wings 14, as in the present practice in aircraft constructions, are located toward the bow of the craft, but the present invention is to be applied irrespective of the position of the wings as present or future engineering may dictate other locations. These hinged sections 15 will however, for the purpose of clarity of expression, be referred to as the bow or fore sections as distinguished from similar sections 18, located at or nearer the stern of the craft. These sections 18 are hinged at 19 to wing-like brakets 20. Both of the hinges 17 and 19 are normally horizontal whereby the sections 15 and 18 oscillate in vertical planes. To oscillate these sections, the section 15 is provided with a bar 21 rigidly secured thereto and extending above and below the surface of said section. Any means of attaching this bar may be employed and the attaching means as shown at Figure 3 is merely illustrative of rigidity. The section 18 is likewise provided with a bar 22 rigidly attached and extending above and below and attached to said section 18 in an equivalent rigid manner.

At some convenient point for the control of the pilot is a worm 23 or other convenient and approved type of operating mechanism which engages a worm 24. This worm 23 may be operated by the pilot in any manner, there being indicated in dotted lines at 25, a wheel for the purpose. The worm 24 is rigidly connected with a shaft 26 which extends transversely of the structure, and is provided upon its opposite ends with pulleys 27. A shaft 28 is properly journaled approximately parallel with the shaft 26, and has a pulley 29 connected with the pulley 27 by a band or belt 30. The shaft 28 also has a pulley 31 over which extends the cables 32 and 33. The cables 32 and 34 extend respectively to the upper and lower ends of the bar 21 for the control of the sections 15, while the cables 33 and 35 are respectively connected with the upper and lower ends of the bar 22 for the control of the sections 18. Properly located, will be idlers 36 over which some of said cables may pass for the purpose of maintaining the cables in taut condition, and to effect the stress of said cables in the proper direction.

In operation, the sections 15 and 18 are not called upon to perform service except as the pilot may choose to employ them for effecting a landing. They are especially designed to effect forced landings when the propulsion discontinues and the altitude of the craft therefore no longer under the control of the pilot by the use of ordinary methods. When the ballast has been adjusted to the proper weight, considering conditions such as speed, wind velocity and other contingents, the sections 15 and 18 may be tilted to the positions shown in dotted lines at Figure 2, or to such intermediate points as the experience and judgment of the pilot may dictate and so inclined may tend to force the craft downwardly to effect a landing at such time and place as the adjustment in conjunction with other existing conditions may afford.

Of course, the aircraft herein illustrated, may be modified in various ways without departing from the invention herein set forth and hereinafter claimed.

The invention is hereby claimed as follows:—

1. The combination with a semi-buoyant aircraft embodying a body and wings of sections of said wings at the after side and adjacent the body hinged to said wings and adapted to swing to an upwardly tilted position, means under the control of the pilot for tilting said sections and a similar device further astern tilting alike in synchronism.

2. The combination with a semi-buoyant aircraft embodying a buoyant body and wings, elevator sections conforming to the lines of the wings, said sections being pivotally mounted in recesses cut out of said wings adjacent to the body, other similar elevators similarly pivoted further astern, and manual means to tilt both of said elevators equally and simultaneously.

In testimony whereof I have signed my name to this specification.

MAX B. PUPP.